(12) United States Patent
Raab et al.

(10) Patent No.: US 6,219,928 B1
(45) Date of Patent: Apr. 24, 2001

(54) SERIAL NETWORK FOR COORDINATE MEASUREMENT APPARATUS

(75) Inventors: Simon Raab, Longwood; Ali Seyed Sajedi, Winter Park; Joselito Parguian, Lake Mary, all of FL (US)

(73) Assignee: Faro Technologies Inc., Lake Mary, FL (US)

( * ) Notice: Subject to any disclaimer, the term of this patent is extended or adjusted under 35 U.S.C. 154(b) by 0 days.

(21) Appl. No.: 09/111,644

(22) Filed: Jul. 8, 1998

(51) Int. Cl.⁷ .................................................. G01B 5/004
(52) U.S. Cl. ............................................. 33/503; 702/150
(58) Field of Search .............................. 33/503; 702/150, 702/151, 152, 153

(56) References Cited

U.S. PATENT DOCUMENTS

| 4,676,002 | 6/1987 | Slocum | 33/1 MP |
|---|---|---|---|
| 4,794,513 | 12/1988 | Müller . | |
| 4,811,561 | 3/1989 | Edwards et al. . | |
| 4,888,877 | * 12/1989 | Enderle et al. | 33/503 |
| 5,402,582 | 4/1995 | Raab | 33/503 |
| 5,724,264 | 3/1998 | Rosenberg et al. . | |

FOREIGN PATENT DOCUMENTS

WO 97/40336   10/1997  (WO) .
WO 98/08050   2/1998   (WO) .

* cited by examiner

*Primary Examiner*—Christopher W. Fulton
(74) *Attorney, Agent, or Firm*—Cantor Colburn LLP

(57) ABSTRACT

An articulated arm for use in a coordinate measuring machine. The arm includes a serial network for communicating data from transducers located in the arm to a controller. Each transducer includes a transducer interface having a memory which stores transducer data. The controller serially addresses each memory and handshaking is performed to transfer the data from the transducer interface memory to the controller.

23 Claims, 4 Drawing Sheets

SERIAL NETWORK FOR COORDINATE MEASUREMENT APPARATUS

BACKGROUND OF THE INVENTION

1. Field of the Invention

The invention relates generally to three dimensional coordinate measuring machines (CMM's). More particularly, this invention relates to a three dimensional CMM including a serial network for transmitting data from the arm to a controller.

2. Prior Art

Conventional CMM's use encoders to provide information on the position of the arm in three dimensional space. FIG. 1 is a side view, partially in cross-section, of an exemplary CMM 10 having six degrees of freedom as described in U.S. Pat. No. 5,402,582, the contents of which are incorporated herein by reference. At each joint, or degree of freedom, a transducer (such as a rotary encoder) 80 is used to produce signals indicating the rotation of each joint and thus, the position of the arm. At the distal end of the CMM 10 is a probe/switch assembly 56 having two switches 150 and 152. Switch 150 is for taking data and switch 152 is for accepting data. As shown in FIG. 1, six encoders 80 are used, one for each degree of freedom. As described in U.S. Pat. No. 5,402,582, the CMM may also include an option port at the probe/switch assembly 56 for the attachment of a variety of options and a temperature transducer.

A drawback to the conventional CMM 10 is the large amount of wiring that must be housed within the arm. Each encoder 80 can require 7 or more wires. The option port, temperature transducer and control buttons 150 and 152 require additional wires. This large number of wires results in increased expense and reliability problems related to the increased number of parts.

SUMMARY OF THE INVENTION

The above-discussed and other drawbacks and deficiencies of the prior art are overcome or alleviated by the articulated arm having a serial network of the present invention. The arm includes a serial network for communicating data from transducers located in the arm to a controller. Each transducer is connected to a transducer interface having a memory which stores transducer data. The controller serially addresses each transducer interface and handshaking is performed to transfer the data from the transducer interface memory to the controller.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
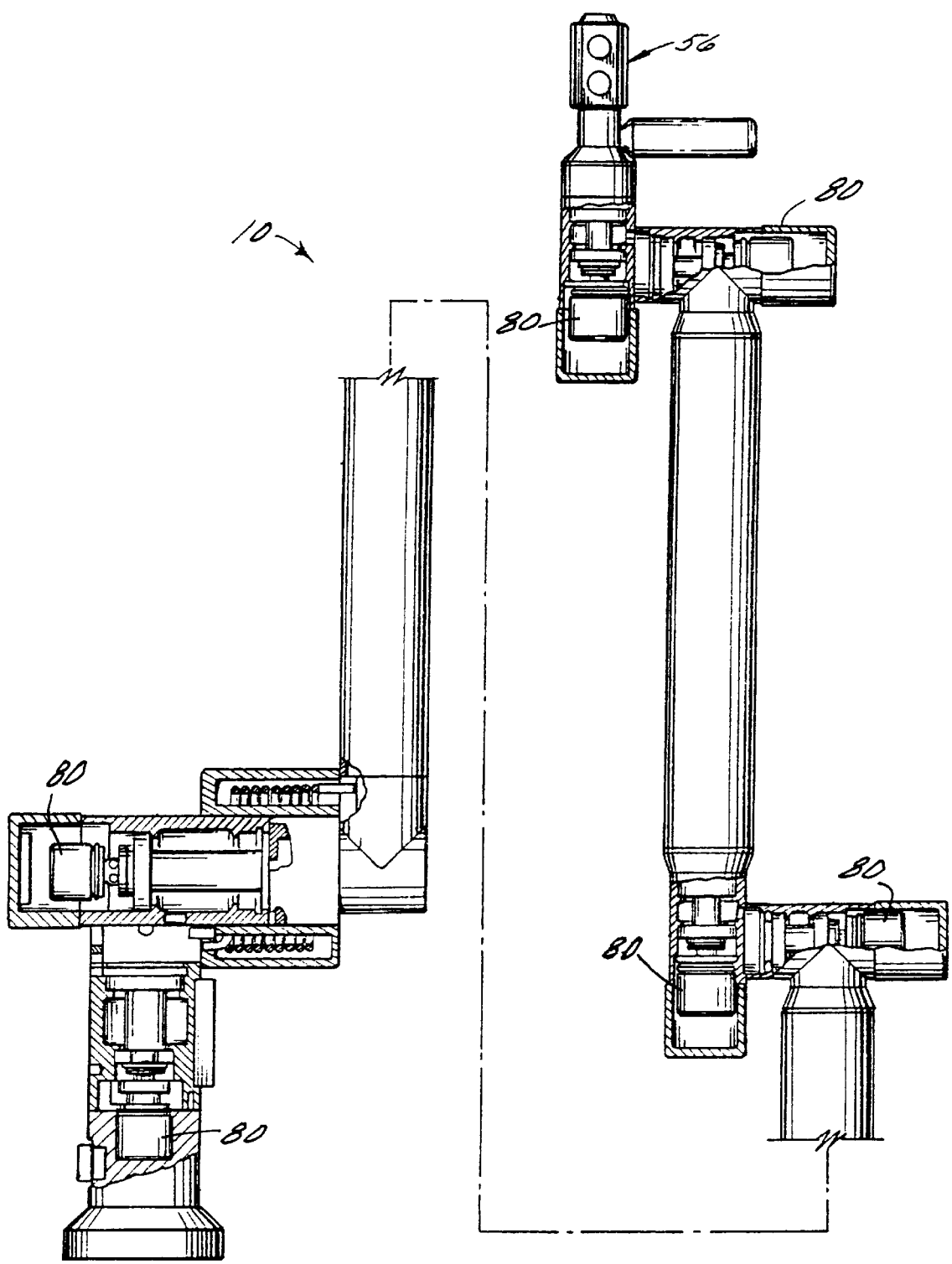
FIG. 1 is a side view, partially in cross-section of a conventional CMM.
Figure 2:
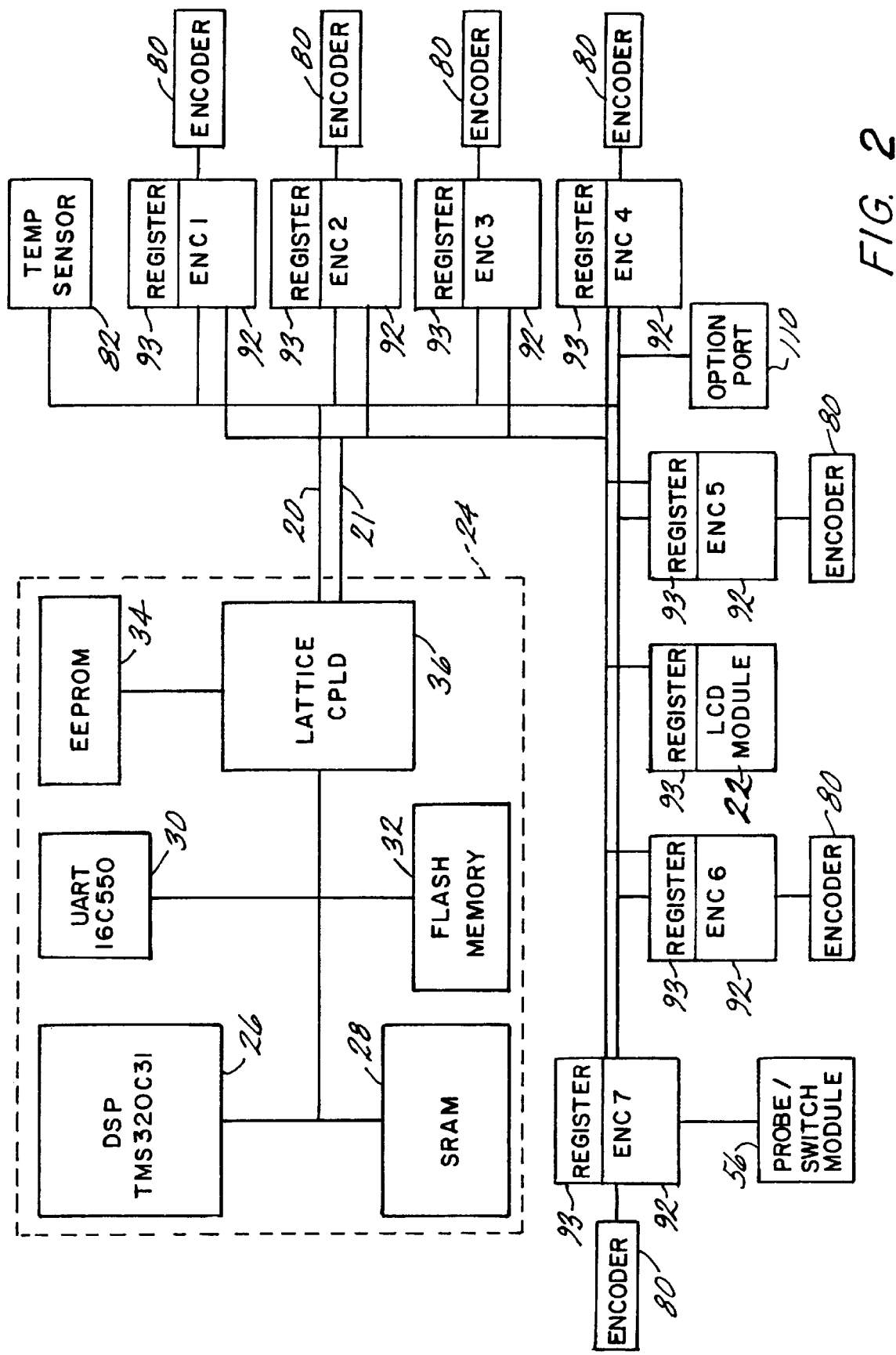
FIG. 2 is a block diagram of the serial network of the present invention.

FIG. 2 is a block diagram of components of an arm including a serial network 20. The serial network 20 is based on an $I^2C$ format. As shown in FIG. 2, a plurality of transducer interface boards 92 are connected to the serial network 20. The probe/switch module 56 is connected to the serial network 20 through a transducer interface 92. An LCD module 22 is connected to the serial network 20 and provides information to the operator. A separate capture line 21 is used to simultaneously instruct the transducer interfaces 92 to store the current transducer data in memory 93. In the embodiment shown in FIG. 2, the memory 93 is implemented using a register. It is understood that other types of memory may be used in the transducer interface. The separate capture line 21 is needed because the latency of the serial network 20 is 1000 microseconds whereas the latency of the capture line 21 is 1 microsecond.

The serial network 20 is also connected to controller 24 which receives signals from the probe/switch module 56 and data from the transducer interfaces 92 and sends information to the LCD module 22. A temperature transducer 82 is also connected to serial network 20 to provide a temperature signal to controller 24. The controller 24 includes a microprocessor 26 and random access memory 28 for storing instructions to be executed by microprocessor 26. A universal asynchronous receiver/transmitter (UART) 30 enables communication from the controller 24 to outside devices such as a host computer. Flash memory 32 stores program instructions and arm parameters permanently. A lattice complex programmable logic device (CPLD) 36 and associated electrically erasable programmable read only memory (EEPROM) 34 are also included in the controller 24. The CPLD 36 contains interconnection logic between the components of controller 24.

Each transducer interface 92 is preferably a printed circuit board including memory 93 which stores the data from a transducer for a particular instant in time. The transducer interface circuit board may also include amplification circuitry to enhance the signal to noise ratio of the received data. FIG. 2 illustrates seven transducer interfaces 92. Each transducer interface 92 can store any type of data, including data from an encoder 80 or data from an alterative source. It is understood that the source of the data stored on each transducer interface can vary depending on the application.

The arm may also include an option port 110 such as that described in U.S. Pat. No. 5,402,582 connected to the serial network 20 as shown in FIG. 2. The option port 110 may include a number of voltage lines and analog-to-digital converter lines for general attachment to a number of options such as variable transducers, a laser scanning device or touch probe.

The CMM 10 must store data indicating the position of each transducer for a particular instant in time. Accordingly, upon depressing the "TAKE" button 150, the data for each transducer (e.g. encoder 80) is stored in memory 93 and the data is serially transferred and stored in controller 24 as described herein. It is understood that other methods may be used to acquire data other than pressing the TAKE button 150. For example, a touch probe may be mounted in the arm which initiates data acquisition upon contact. When the operator depresses the "ACCEPT" button 152, the transducer data stored into controller 24 is transferred to a host computer through UART 30.

Figure 3:
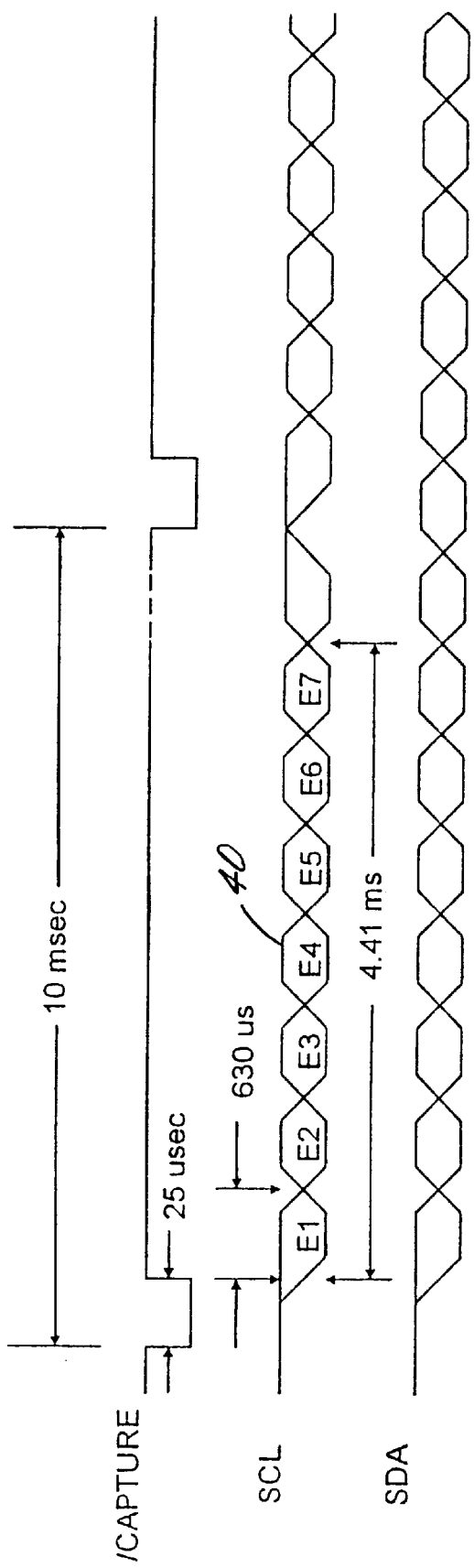
FIG. 3 is a timing diagram illustrating the transfer of data from multiple encoders.

FIG. 3 is a timing diagram illustrating the transfer of data from multiple transducer interfaces. When the operator initiates data acquisition (e.g. by pressing the TAKE button 150) this initiates a CAPTURE cycle having a duration of 10 msec. This allows the user to collect 100 data points per second. As indicated by the serial clock line SCL, the data from each transducer interface 92 is transferred in intervals of 630 us. Each event 40 represents the transfer of data from memory 93 to controller 24 and is described in detail below with reference to FIG. 4.

Figure 4:
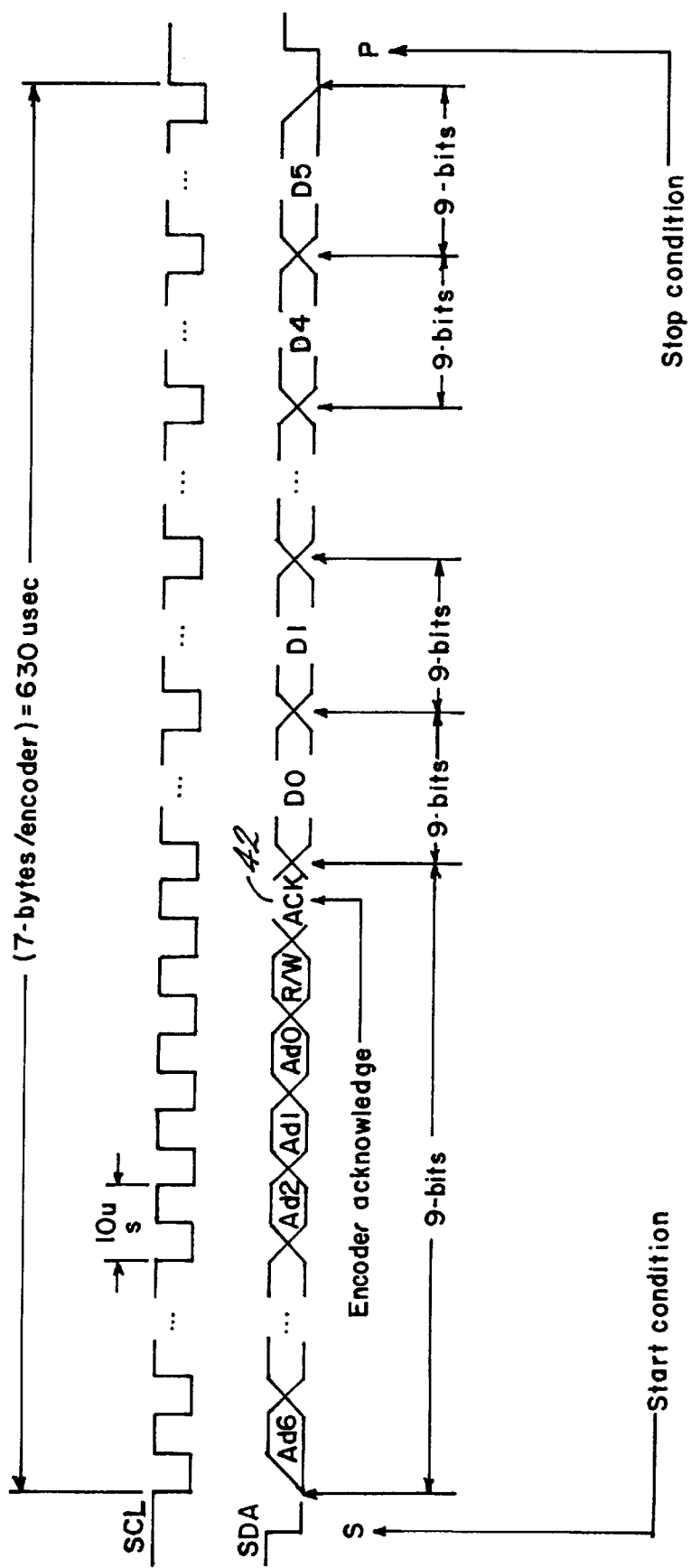
FIG. 4 is a timing diagram illustrating the transfer of data from a single encoder.

FIG. 4 is a timing diagram illustrating one event 40 showing the bi-directional transfer of data on the serial data line (SDA) between controller 24 and one transducer interface 92. Upon initiation of a CAPTURE cycle (e.g. by the user depressing the TAKE button 150), each memory 93 stores the data from a respective transducer (e.g. encoder 80). The controller 24 then addresses each transducer interface 92 serially. As shown in FIG. 4, for each event 40, the controller 24 addresses a transducer interface 92 through address bits Ad6–Ad0 and a read/write bit (R/W). The ninth bit ACK 42 is an acknowledge signal from the transducer interface 92 to the controller 24 indicating that a valid address has been accessed. Bytes D0–D5 represent data transferred from the memory 93 to the controller 24. The ninth bit of each byte D0–D5 is an acknowledge bit from the controller 24 to the transducer interface 92 indicating that the controller 24 has received the byte. The handshaking shown in FIG. 4 is performed for each transducer interface 92.

The present invention provides a system for serially transferring data from the plurality of transducers in a CMM to a controller. The use of a serial network significantly reduces the amount of wires needed in the CMM thereby reducing the number of parts and enhancing the reliability of the CMM.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A three dimensional coordinate measuring system comprising:
   a movable arm including a plurality of joints with each joint corresponding to a degree of freedom such that said arm is movable within a selected volume, a plurality of said joints having a transducer, each said transducer producing position data;
   a controller coupled to said tranducers for receiving said position data;
   a capture line coupled to said controller for transmitting a capture signal for initiating acquisition of said position data;
   a serial network coupled to said controller and said transducers for transferring said position data to said controller.
   a display coupled to said serial network, said display providing information to an operator.

2. The coordinate measuring system of claim 1 further comprising:
   a transducer interface associated with each of said transducers, each said transducer interface including a memory for storing said position data;
   wherein said capture line signals each said transducer interface to store said position data in said memory;
   wherein said serial network transfers said position data from each said memory to said controller.

3. The coordinate measuring system of claim 2 wherein each transducer interface is addressable and said controller serially addresses each transducer interface to transfer said position data from each said memory to said controller.

4. The coordinate measuring system of claim 2 wherein:
   said memory lacks ability to execute instructions.

5. The coordinate measuring system of claim 1 wherein said transducer is an encoder.

6. The coordinate measuring system of claim 1 further comprising:
   a temperature transducer for generating temperature data;
   wherein said temperature transducer is connected to said network.

7. The coordinate measuring system of claim 1 further comprising:
   an option port connected to said serial network.

8. The coordinate measuring system of claim 1 wherein:
   said controller includes a communication device for transferring said position data to a host system.

9. The coordinate measuring system of claim 8 wherein:
   said communication device is a universal asynchronous receiver/transmitter.

10. A method of transferring position data from a plurality of transducers located in a moveable arm to a controller comprising:
    storing the position data for each transducer in a respective memory provided in a transducer interface, said memory lacking the ability to execute instructions;
    serially accessing the position data in each memory; and
    serially transferring the position data to the controller via a serial network.

11. The method of claim 10 wherein said storing comprises providing a capture signal to the transducer interface and storing position data for a specific instant in time in each memory.

12. The method of claim 10 wherein said serially accessing comprises addressing the transducer interface and sending an acknowledge bit to the controller upon validly addressing the transducer interface.

13. The method of claim 10 wherein said serially transferring comprises transferring position data from the transducer interface to the controller, wherein the controller sends an acknowledge bit to the transducer interface upon receipt of the position data.

14. A three dimensional passive coordinate measuring system comprising:
    a movable arm including a plurality of joints with each joint corresponding to a degree of freedom such that said arm is movable within a selected volume, a plurality of said joints having a transducer, each said transducer producing position data;
    a capture line coupled to said transducers for transmitting a capture signal for initiating acquisition of said position data;
    a serial network coupled to said transducers for transferring said position data to a controller;
    a display coupled to said serial network, said display providing information to an operator.

15. The coordinate measuring system of claim 14 further comprising:
    a transducer interface associated with each of said transducers, each said transducer interface including a memory for storing said position data;
    wherein said capture line signals each said transducer interface to store said position data in said memory; and
    wherein said serial network transfers said position data from each said memory to said controller.

16. The coordinate measuring system of claim 15 wherein each transducer interface is addressable and said controller serially addresses each transducer interface to transfer said position data from each said memory to a controller.

17. The coordinate measuring system of claim 14 wherein said transducer is an encoder.

18. The coordinate measuring system of claim 14 further comprising:
   a temperature transducer for generating temperature data;
   wherein said temperature transducer is connected to said serial network.

19. The coordinate measuring system of claim 14 further comprising
   an option port connected to said serial network.

20. A method of transferring position data from a plurality of transducers located in a moveable arm to a controller, the arm comprising a component of a passive coordinate measuring system, comprising:
   storing the position data for each transducer in a respective memory provided in a transducer interface, said memory lacking the ability to execute instructions;
   serially accessing the position data from each transducer; and
   serially transferring the position data to a controller via a serial network.

21. The method of claim 20 wherein said storing comprises providing a capture signal to the transducer interface and storing position data for a specific instant in time in each memory.

22. The method of claim 20 wherein each transducer includes a transducer interface and wherein said serially accessing comprises addressing the transducer interface and sending an acknowledge bit to controller upon validly addressing the transducer interface.

23. The method of claim 20 wherein each transducer includes transducer interface and wherein said serially transferring comprises transferring position data from the transducer interface to a controller, wherein such controller sends an acknowledge bit to the transducer interface upon receipt of the position data.

* * * * *